United States Patent
Norman et al.

(10) Patent No.: US 8,504,200 B2
(45) Date of Patent: Aug. 6, 2013

(54) SYSTEM AND METHOD FOR MANAGING AND CONTROLLING ROBOT COMPETITION

(75) Inventors: David A. Norman, Greenville, TX (US); Robert H. Mimlitch, III, Rowlett, TX (US); Paul S. Adams, Dallas, TX (US)

(73) Assignee: Innovation First, Inc., Greenville, TX (US)

( * ) Notice: Subject to any disclaimer, the term of this patent is extended or adjusted under 35 U.S.C. 154(b) by 0 days.

(21) Appl. No.: 13/224,996

(22) Filed: Sep. 2, 2011

(65) Prior Publication Data

US 2012/0029695 A1 Feb. 2, 2012

Related U.S. Application Data

(60) Continuation of application No. 11/969,862, filed on Jan. 4, 2008, now Pat. No. 8,014,897, which is a continuation of application No. 11/682,244, filed on Mar. 5, 2007, now Pat. No. 7,330,776, which is a continuation of application No. 10/629,475, filed on Jul. 29, 2003, now Pat. No. 7,193,384, which is a division of application No. 09/972,675, filed on Oct. 5, 2001, now Pat. No. 6,674,259.

(60) Provisional application No. 60/238,354, filed on Oct. 6, 2000.

(51) Int. Cl.
*G06F 19/00* (2011.01)
(52) U.S. Cl.
USPC ........... 700/245; 700/248; 700/250; 700/251; 700/253; 700/258; 318/568.1; 318/568.11; 318/568.12; 318/568.15; 318/567; 180/8.1; 180/168; 180/169; 901/1; 901/6; 901/22; 901/23; 901/43; 701/23

(58) Field of Classification Search
USPC ................. 701/245, 248, 250, 251, 253, 258, 701/259, 23; 318/568.1, 568.11, 568.12, 318/568.15, 567, 569, 581; 343/247, 365; 180/8.1, 168, 169; 901/1, 6, 22, 23, 43, 45
See application file for complete search history.

(56) References Cited

U.S. PATENT DOCUMENTS 4,710,020 A 12/1987 Maddox et al.
5,299,764 A 4/1994 Scott
(Continued)

OTHER PUBLICATIONS

Dijkstra, Marcel, and Martena, Albert R., "Radio controlled robot car, using the Ericcson Bluetooth starter kit," Examination work BEE 00-13, University of Karlskrona/Ronneby, Jul. 2000, 100 pages.

(Continued)

*Primary Examiner* — McDieunel Marc
(74) *Attorney, Agent, or Firm* — Fish & Richardson P.C.

(57) ABSTRACT

A system and method for operating robots in a robot competition. One embodiment of the system may include operator interfaces, where each operator interface is operable to control movement of a respective robot. A respective operator interface may be in communication with an associated operator radio, where each radio may have a low power RF output signal. A robot controller may be coupled to each robot in the robot competition. A robot radio may be coupled to a respective robot and in communication with a respective robot controller and operator radio. The robot radios may have a low power RF output signal while communicating with the respective operator radios. Alternatively, the radios may be short range radios, where a distance of communication may be a maximum of approximately 500 feet.

20 Claims, 12 Drawing Sheets

U.S. PATENT DOCUMENTS

| | | | |
|---|---|---|---|
| 5,760,560 | A | 6/1998 | Ohya et al. |
| 6,166,627 | A | 12/2000 | Reeley |
| 6,220,865 | B1 | 4/2001 | Macri et al. |
| 6,408,226 | B1 * | 6/2002 | Byrne et al. ............ 700/258 |
| 6,484,083 | B1 | 11/2002 | Hayward et al. |
| 6,491,566 | B2 * | 12/2002 | Peters et al. ............ 446/454 |
| 6,496,755 | B2 * | 12/2002 | Wallach et al. ............ 700/245 |
| 6,535,793 | B2 | 3/2003 | Allard |
| 6,674,259 | B1 * | 1/2004 | Norman et al. ............ 318/568.11 |
| 6,845,297 | B2 | 1/2005 | Allard |
| 6,928,490 | B1 | 8/2005 | Bucholz et al. |
| 7,085,623 | B2 | 8/2006 | Siegers |
| 7,120,519 | B2 | 10/2006 | Okabayashi et al. |
| 7,127,325 | B2 | 10/2006 | Nagata et al. |
| 7,193,384 | B1 * | 3/2007 | Norman et al. ............ 318/568.1 |
| 7,321,808 | B2 * | 1/2008 | Nagamatsu ............ 700/248 |
| 7,330,776 | B1 * | 2/2008 | Norman et al. ............ 700/245 |
| 8,014,897 | B2 * | 9/2011 | Norman et al. ............ 700/245 |
| 2001/0037163 | A1 | 11/2001 | Allard |
| 2002/0107591 | A1 | 8/2002 | Gabi et al. |
| 2003/0216834 | A1 | 11/2003 | Allard |

OTHER PUBLICATIONS

Hinkle et al., Competition and Exhibition Robot, 1996, Internet, pp. 31-45.

Asada, Vision Based Reinforcement Learning for RoboCup Towards Real Robot Competition, 1995, Internet, pp. 1-8.

Buhmann et al., The Mobile Robot RHINO, 1995, Interne, pp. 1-7.

Almeida et al., Mobile Robot Competitions Fostering Advances in Research, Development and Education in Robotics, 2000, Internet, pp. 106.

Lee et al., A robot in intelligent environment: SoccerRobot, 1999, IEEE, pp. 73-78.

Abbate, Luis Ricardo Sierra, "Automatic Verification of Hybrid Systems: An Audio Control Protocol," IEEE, 1998, pp. 184-191.

* cited by examiner

SYSTEM AND METHOD FOR MANAGING AND CONTROLLING ROBOT COMPETITION

CLAIM OF PRIORITY

This application is a continuation application and claims priority to U.S. patent application Ser. No. 11/969,862 filed Jan. 4, 2008, now U.S. Pat. No. 8,014.897 which is a continuation of U.S. patent application Ser. No. 11/682,244 filed Mar. 5, 2007, now U.S. Pat. No. 7,330,776, which is a continuation of U.S. patent application Ser. No. 10/629,475 filed on Jul. 29, 2003, now U.S. Pat. No. 7,193,384, which is a divisional of U.S. patent application Ser. No. 09/972,675, filed Oct. 5, 2001, now U.S. Pat. No. 6,674,259, which claims priority to U.S. Provisional Patent Application No. 60/238,354, filed Oct. 6, 2000, the entire contents of which are hereby incorporated by reference.

BACKGROUND OF THE INVENTION

1. Technical Field of the Invention

The principles of the present invention generally relate to robot competitions, and more specifically, but not by way of limitation, to a system and method for managing, controlling, and providing safety for robot competitions.

2. Description of Related Art

Robot competitions have become popular in the recent past. The robot competitions are used as incentive to motivate people of all ages to become interested in math, science, and engineering; robot design and development; and used as entertainment events. One popular robot competition is organized for high school students and sponsored by large corporations. In these robot competitions, contestants of the robot competitions are asked to create robots to perform a wide range of tasks, such as picking up tennis balls, stacking blocks of wood, and everything in-between. Other popular robot competitions have been organized and conducted by people with robots built as a hobby to perform more advanced activities. Still yet, more robot competitions have been organized by for-profit promoters, and match contestants against one another to design large, dangerous robots that clash in an arena for a fight, such as a boxing or wrestling match.

Robot competitions are generally concerned with four issues: (i) event safety, (ii) event integrity, (iii) event flow, and (iv) event control. These four issues are important from liability, learning, and revenue generated standpoints.

Event safety is an extremely important issue for robot competitions. Depending upon the robot competition, the robots may range in size from ounces to hundreds of pounds, and may reach speeds of up to 30 miles per hour or more in relatively short distances. Additionally, the larger robots may include weapons, such as gripping devices, hammers, rotating arms, and saws to be utilized during the robot competitions. Robots having such devices may be extremely dangerous for the contestants, organizers, and spectators of the robot competitions if an uncontrolled situation occurs.

While the size, strength, and capabilities of the robots may in and of themselves be dangerous, the event safety issue is exponentially increased due to tens or several hundreds of robots being entered in any robot competition. And, as contestants prepare and test the robots prior to entering the arena for an event, the contestants routinely lose control of their robots due to a robot malfunction, radio control interference, or human error.

With regard to radio interference, robot competitions have been conducted traditionally in two ways, (i) allowing contestants to utilize mixed, non-uniform radio equipment, and (ii) requiring contestants to utilize consistent radio equipment. In the case of contestants utilizing mixed radio equipment, contestants generally have adapted model airplane radio controllers for the robots because these radio controllers have more capability and frequency channels than radio controllers for remote control cars, for example. However, because the model airplane radio controllers transmit at high power levels, two watts or more, in general, these radio controllers are problematic for robot competitions due to, for example, radio frequency (RF) noise, electromagnetic interference (EMI), co-channel interference, and multipath effects due to being in an indoor environment. These radio control problems may cause unexpected effects, such as a contestant controlling a robot of a different contestant or a robot performing mysterious actions. Also, the use of mixed radio equipment often results in two or more contestants operating on or near the same frequency, which will likely cause a contestant to unknowingly drive a robot of another contestant, thereby creating a dangerous situation for the contestants, organizers, spectators, and robots.

With regard to event integrity, an organizer of the robot competition is concerned about conducting a fair and honest competition. In the traditional robot competitions, contestants utilizing both the mixed and consistent radio equipment have no absolute regulation to prevent early starts, late starts, or late stops of the robots. For activity-type competitions, a contestant may cheat and start or continue the activity prior to or after a clock starts and stops, respectively. In a fight-type competition, a contestant may strike an opposing robot prior to or after the clock starts and stops, respectively. If such an early or late strike occurs, the opposing robot may suffer irreparable damage, and the contest may be jeopardized, thereby destroying the integrity of the event as the contest cannot be replayed.

With regard to event flow, as radio controllers are essentially unregulated, including operating on the same frequencies and having high power transmitters, robot competition organizers are required to confiscate radio controllers from the contestants to minimize safety hazards. The organizers often utilize as many as fifteen people to confiscate and guard the radio controllers in a storage room. In the case of non-consistent radio equipment, organizers have instituted different techniques, including both low budget and elaborate techniques, to assign frequency channels to contestants. These techniques range from (i) attaching a number to a clothes pin to be used for checking out the radio controller for a match, (ii) utilizing a software program specifically written to ensure that two contestants do not operate on the same or close frequency simultaneously, and (iii) utilizing a spectrum analyzer to monitor frequency channel usage. Even using these techniques to avoid having two radios operating on the same frequency, mistakes have routinely been made and safety has been jeopardized. It is common to find a contestant's radio to be transmitting on a different frequency than expected. Some common causes are human error, intentional misuse, mislabeled crystals, poor or old equipment, and lack of knowledge of the equipment by the contestant. Also, contestants routinely have additional radio controllers that are "backups" that are not confiscated and pose a safety hazard.

In the case of using consistent radio equipment, such as having transmitters operating on frequency channels A, B, C, and D, confusion and accidents routinely occur as contestants have trouble with installation of the radio equipment, forget to return the radio equipment, or simply use their own radio equipment. And, installing radio equipment into the robot electronics for the first time may produce unexpected results or no results at all. Pragmatically, contestants want to perform last minute testing of the robots prior to entering the robot competition. Without having a radio controller because the organizers only have enough for competition purposes, such a test is not possible. Furthermore, as the robots may weigh several hundred pounds or more and be tract driven, the contestants may need radio control to move the robot between different staging areas, and to load and unload the robot from the arena. Furthermore, issues resulting from poor control of match starts and stops, as mentioned previously, leads to re-match requests by contestants for the reason of fairness. Re-matches cause havoc for schedules, adding complexity and confusion to event flow. Logistical problems associated with the event flow issue often cause delay before, during, and after a match, and alter smooth flow of the overall robot competition.

With regard to the event control issue, organizers of the robot competition are interested in controlling frequency usage and regulating start and stop times of the robots for safety, event integrity, and event flow considerations. However, traditional robot competitions have been unsuccessful in implementing a viable solution to handle the event control issue. While the coordinators have tried to regulate and assign frequency channels, problems still occur. Organizers are subjected to rely on unregulated equipment and a contestant honor system. Data rejection via a checksum or robot identifier signal to be verified by the robots is an idea that simply has not been instituted. Also, contestants tend to start and stop a match early and late to gain a competitive advantage and frequency channels are routinely crossed due to a mix-up of issuing radio controllers by the organizers of the robot competitions.

The above issues provide just a sampling of the problems that organizers and contestants of robot competitions have faced. Other issues that the organizers face are Federal Communication Commission (FCC) control for the radio frequency and RF power usage, governmental oversight of safety issues, and television networks desiring more streamlined competition for production purposes. With the popularity of the robot competitions becoming increasing larger, these issues need to be solved.

SUMMARY OF THE INVENTION

To solve the problematic issues of robot competitions, including (i) event safety, (ii) event integrity, (iii) event flow, and (iv) event control, a system and method has been designed to manage and control robot competitions. The principles of the present invention may include components that can be divided into two basic categories, components used by the contestants, and components used by the event organizers. The various contestant and organizer components have been seamlessly integrated into a complete wireless robot control system. The wireless robot control system may be used by robot designers and contestants of the robot competition to pilot and control the robot(s). The wireless robot control system also provides a simple method of ensuring that the equipment includes safety features according to the principles of the present invention and may be easily identified as having the safety features by the event organizers simply by recognizing the equipment brand. The components used by the event organizers form a competition control system and ensure event safety and integrity to manage event flow and to provide control over the equipment of the contestants as needed to safely conduct the competition. The system may provide for a field controller, arena controller, operator interface, and robot controller to be utilized to ensure for event safety, integrity, flow and control of a robot competition. By utilizing the system and method, event organizers can focus more on the goals of the competition, whether for educational or entertainment purposes, and spend less time on communication and competition issues.

The principles of the present invention include a system and method for operating robots in a robot competition. One embodiment of the system may include operator interfaces, where each operator interface is operable to control movement of a respective robot. A respective operator interface may be in communication with an associated operator radio, where each radio may have a low power RF output signal. A robot controller may be coupled to each robot in the robot competition. A robot radio may be coupled to a respective robot and in communication with a respective robot controller and operator radio. The robot radios may have a low power RF output signal while communicating with the respective operator radios. Alternatively, the radios may be short range radios, where a distance of communication may be a maximum of approximately 500 feet.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
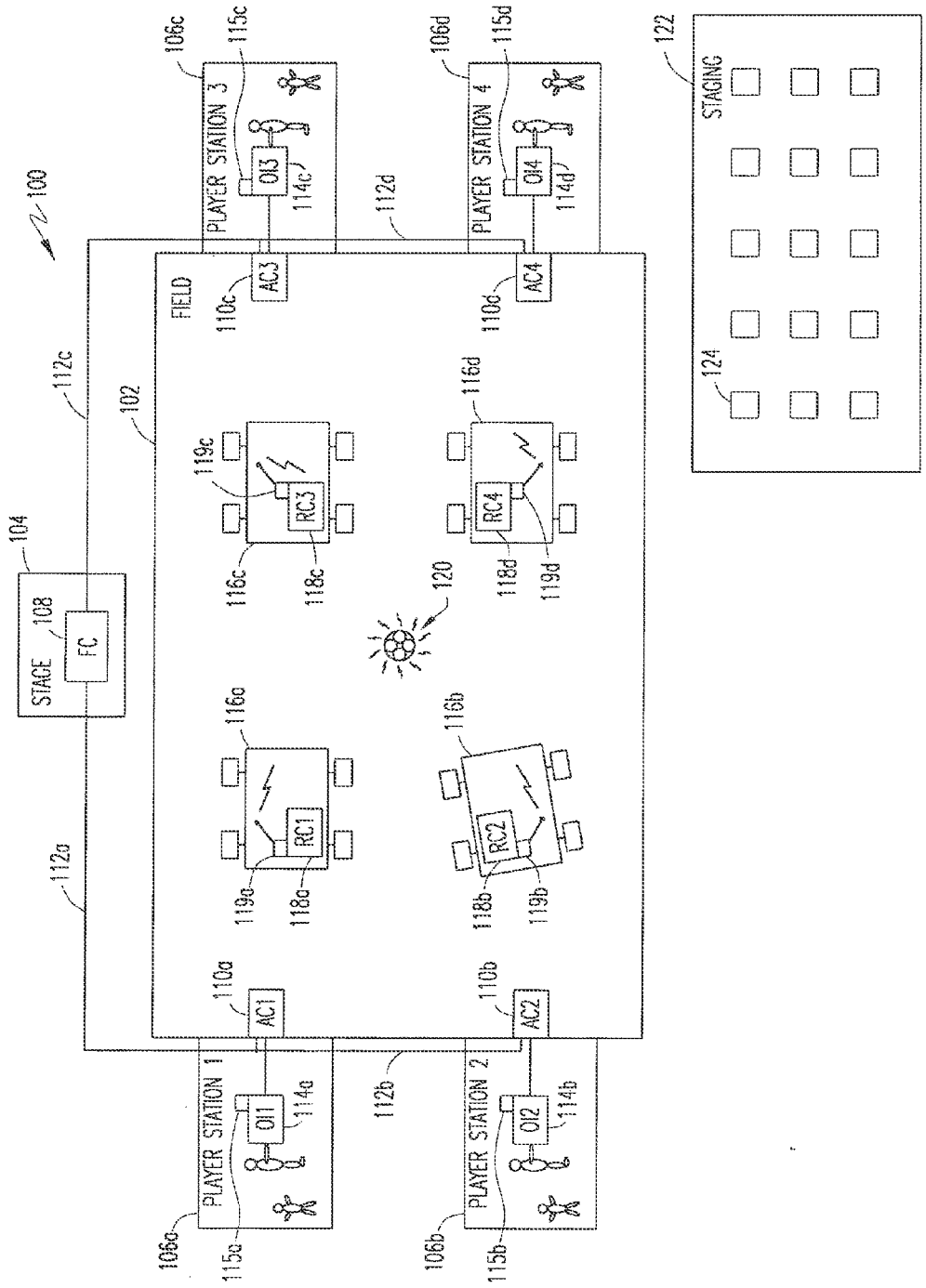
FIG. 1 is an exemplary diagram of a robot competition including a field with contestants and robots.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Robot competitions have become increasingly popular in the recent past. The robot competitions include high school students, who compete to create robots to perform an activity, such as picking up tennis balls and placing the tennis balls in a bucket, and robot enthusiasts who create large, dangerous robots that compete on a field within an arena in a fight. These robot competitions may include thirty contestants for local competitions and as many as 500 robots, thousands of contestants, and tens of thousands of spectators for a national competition.

There are generally four issues of concern for organizers of the robot competitions, including: (i) event safety, (ii) event integrity, (iii) event flow, and (iv) event control. The organizers have addressed these issues in a variety of ways, but ultimately a system is needed to properly address and handle these issues. The system and methodology described herein address these and other issues.

The system, according to the principles of the present invention, may include a field controller, arena controller(s), operator interfaces, and robot controllers. The field controller may be utilized by the organizers to perform field management of the robots participating on and off the field of the arena. At least one arena controller may communicate with the field controller to assist in executing the field management. For example, the field controller may be utilized by the organizer of the robot competition to enable and disable the robots to start and stop a match. The operator interfaces may be coupled to the arena controller(s) and be utilized to control and monitor the robots by the contestants of the robot competition. The operator interfaces communicate with the robot controllers via radios being of essentially the same type and having low radio frequency (RF) power output, generally below approximately 0.25 watts, to reduce interference between robots. The radios may also be identified as having a short communication range, such as approximately 500 feet. Additionally, each operator interface may be assigned a frequency channel on which to communicate to a respective robot during the competition.

To address safety issues, the robot controller, and applicable software and/or hardware as understood in the art, may control the radio coupled thereto to sweep through the competition frequencies, which are restricted otherwise, until a positive determination is made to identify control data, such as checksum, team number, and frequency channel number. By identifying the control data, organizers may ensure that each robot operates on a separate frequency in response to a corresponding operator interface. And, once a robot controller is assigned the correct frequency channel number, it may lock to that frequency until powered off.

To allow for contestants to test the robots in a staging area or pit 124 area prior to competing, the robot controller may include an input port for a tether cable from an operator interface. The operator interface may be the same as the operator interface typically utilized to control the robot or another operator interface with reduced capabilities. Also, the tether input port may be the same as the input port for the radio coupled to the robot. By utilizing a tether, in the staging, RF noise and potential safety hazards are reduced.

Because the system for operating the robot competition addresses the four issues of concern for the organizers, robot competitions may be safely and smoothly conducted. And, because the organizers can sell consistent equipment to the contestants prior to the robot competition, the contestants may simply design the robot controllers into the robot and concern themselves with the mechanics of the robot design rather than communication issues. Utilizing the system, the organizers may avoid scrutiny from government agencies, such as the FCC, as the radios of the system meet FCC regulations and the system provides a high level of safety to protect contestants and others attending the robot competition.

FIG. 1 is an exemplary diagram of an arena 100 for conducting a robot competition. The arena 100 generally includes at least one field 102 and stage or table 104 for organizers to oversee the field 102. Player stations 106a-106d may be located around the perimeter of the field 102 to allow contestants to reside during a match of the robot competition.

A competition control system, according to the principles of the present invention, includes a number of components to conduct and control the robot competition. The components may include a field controller (FC) 108 coupled to arena controllers (AC1-AC4) 110a-110d (collectively 110) via cables 112a-112d (collectively 112), respectively. Operator interfaces (OI1-OI4) 114a-114d (collectively 114) may be further coupled to respective arena controllers 110. Operator radios 115a-115d (collectively 115), coupled to respective operator interfaces 114, may be utilized to communicate information between the operator interfaces 114 and associated robots 116a-116d (collectively 116). The operator radio 115a may be either external or part of the operator interface 114a. Each of the robots 116 includes a robot controller 118a-118d (collectively 118) coupled to robot radios 119a-119d (collectively 119). The robot radio 119 may be either external or part of the robot controller 118.

To avoid having radio interference or fading when a robot 116a associated with an operator interface 114a is positioned across the field 102 and closer to a different operator interface 114d, a centralized radio and/or antenna grouping 120 may be utilized to communicate between the operator interfaces 114 and robot controllers 118. A pits area 124 is utilized by event organizers to provide a common area for robots and contestants not presently competing, and may be utilized by contestants to test, repair, and prepare the robots between matches. A staging area 122 is utilized by organizers to assist in event flow by collecting or "staging" robots and contestants prior to a match, and is utilized by contestants to test and prepare the robots prior to a match.

Figure 2:
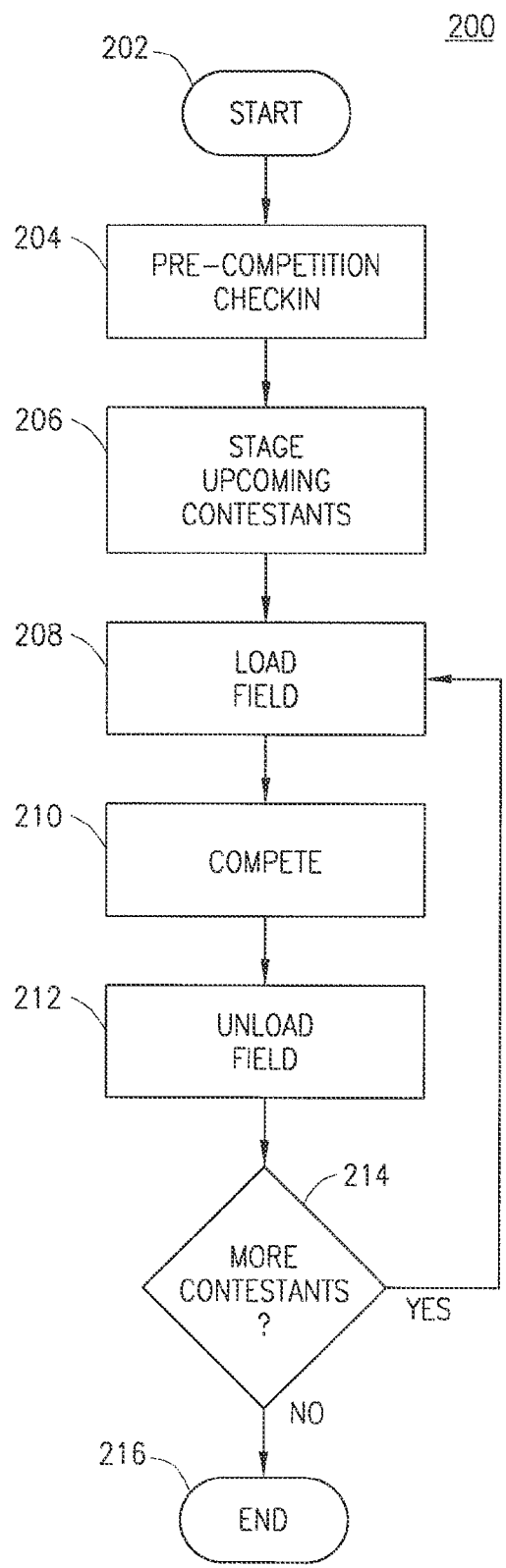
FIG. 2 is an exemplary flow diagram flow for conducting the robot competition conducted on the field of FIG. 1.

FIG. 2 is an exemplary flow diagram 200 for conducting a robot competition utilizing the arena 100 of FIG. 1. While the flow diagram 200 is general in nature, given that tens or hundreds of robots may be competing in a single robot competition, event flow, which includes safely and timely moving robots onto and off-of the field 102, is important for organizers, contestants, and spectators of the robot competition. By improving flow of a robot competition, more events may be conducted and more robots can compete, which ultimately increases spectator interest and reduces expensive schedule time if filming crews are present. A comparison between traditional robot competitions and robot competitions utilizing the control system according to the principles of the present invention are described with regard to FIG. 2.

The process starts at step 202. At step 204, the organizers conduct a pre-competition checkin to register the contestants and robots into the robot competition. To ensure safety, robots may not communicate on the same frequency at the same time, during matches and pre-match preparation. In a traditional robot competition, if the contestants used inconsistent, commercially available radio control equipment, such as model airplane radio controllers, every contestant was assigned a different frequency channel. If, however, different frequency channels for all of the robots could not be procured, a radio checkin/checkout procedure was utilized, which limited the contestants from performing adequate pre-match testing in the pits 124. In the case of using custom control equipment provided by at least one organizer of robot competitions, all radios, which included high power radios, were confiscated at checkin or a special dongle (i.e., jumper setting cable) was installed to each robot entering and exiting the field. The instant control system allows contestants to simply register without having to relinquish the operator interface 114 (i.e., radio controller) because the radio controllers are low RF power, competition channels are protected and accessible via arena controllers 110, and practice channels are available, for example. Additionally, organizer intervention is greatly reduced as the control system coordinates the frequency channels and data rejection, utilizing, for example, frequency channel number, team number, and checksum, during communication between the operator interfaces 114 and the robot controllers 118. It should be understood that the frequency channel number may simply be a channel number as various communication techniques, such as code division multiplexing, do not utilize frequency per se. Also, the channel number may include a time slot number for a time division multiplexing communication technique.

At step 206, contestants to partake in an upcoming event are staged in the staging area 122 to ensure that the contestants and robots 116 are prepared for the event. In the traditional robot competitions, contestants using commercial equipment organizers had to verify that contestants in the staging area 122 were communicating on different frequency channels from those competing, loading, unloading, and in the staging area 122 or request that radio controllers remain powered off. In the case of contestants using custom control equipment of the organizer of robot competitions, contestants could not use the radios in the pits 124 due to the limited number of frequency channels and the high power transmission would interfere with others in the pits 124 and field 102. While the custom control equipment had tether capabilities, AC power outlets had to be available, which was generally not the case. The instant control system provides "open" or test channels and may include a tether connection capable of receiving power from the robot. If the radio link is used, the low power transmission does not substantially interfere with the robots competing. Because competing robots are on frequencies unavailable to contestants not on the field, same frequency interference should not occur.

At step 208, radio communication is typically used to ensure that the robots 116 are ready to compete. In the traditional robot competitions with contestants using commercial equipment, the organizers had to verify that contestants loading were on different frequency channels from those unloading, competing, and staging. Organizers had no control over unsafe actions. For the custom control equipment robot competitions, contestants had to wait for those unloading before loading due to a limited number of frequency channels and high radio power. In the instant control system, contestants loading the robots 116 may power the robots 116 as the robots 116 may be automatically assigned different frequency channels. Additionally, the organizers may disable robot movement globally within the arena to reduce setup time or individually to halt unsafe operating conditions.

Once a contestant situates the robot 116a on the field 102, using the instant control system, the robot 116a is powered on and the robot controller 118 searches available frequency channels for a preassigned team number. The operator interface 114a may be connected to the arena controller 110a at the player station 106a. The arena controller 110a provides the operator interface 114a with power, communicates a password to the operator interface 114a thereby allowing access to competition-only channels, commands the proper channel to use to the operator interface 114a, and communicates a signal to disable movement of the robot 116a.

Once the operator interface 114a and robot controller 118a have established communication, the operator interface 114a indicates that a good link exists. Field coordinators check that each robot has a good link before starting the match. In one embodiment, the operator interfaces 114 and arena controllers 110 may indicate that a good link has been established by turning on lights.

Further at step 208, a pre-competition checkout is performed, typically by an organizer asking, "Are the robot ready?" and "Are the contestants ready?" As robot competitions typically have a specific starting area for the robots prior to the start of a match, time is lost when contestants test the robots 116 and move out of the areas. The robots 116 must be moved back within the areas manually or remotely, which may be dangerous to anyone on the field 102. In the case of using commercial radio controllers, determining if the robots 116 are ready requires testing the control system by moving the robots 116, robot arms and/or weapons, which may be dangerous to anyone on the field 102. Clearing the field 102 first causes delay. Since radio equipment remains on, as the radios cannot be turned off, the contestants are confident that their equipment is ready. In the case of using custom control equipment, determining if the robots 116 are ready requires testing the control system and moving the robots 116, robot arms and/or weapons, which, again, is dangerous to anyone on the field. Again, clearing the field 102 first causes delay. Once the system is tested, the operators system is powered off by the competition coordinators to prevent contestants from moving prior to the start of the match. Because the system is powered off, the coordinators and contestants cannot be certain that the system will come back on properly and timely. Additionally, the robot radios 119 remain listening to the frequency channels and are susceptible to noise and adjacent channel reception as no data rejection exists in the system. With regard to the instant control system, determining if the robots are ready requires checking for communication between the operator interfaces 110 and the robot controllers 118. The communication check may be performed without verbal communication or hand signals, as performed in the past. Since the radios 115 and 119 remain on with robot movement disabled, the contestants are confident that the equipment is ready. Furthermore, the robots 116 remain in place as a control system check by moving the robots 116 and/or the components on the robots is unnecessary, thereby providing additional safety to anyone on the field 102.

At step 210, a match of the robot competition is performed. The beginning of the match is important in robot competitions, specifically when collecting points is involved. The robots should start and stop at precisely the same time. Stopping the match may be even more important for determining the final number of points and preventing damage infliction after the end for a "late hit". Also, during a match, it is possible for a contestant to violate the rules of the game to the extent that a disqualification occurs. In an event involving more than two robots 116, disqualification generally involves stopping the infringing robot 116.

With regard to the use of commercial equipment, since the radio control equipment is always on, early starts may occur, which results in restarting the event and using additional time. An uncontrolled stoppage of the event creates an issue as noise within an arena may be overwhelming for the contestants, thereby requiring event coordinators to use hand signals to identify event stops, and a proper stoppage may not occur.

With regard to using custom control equipment, because the control system is completely turned off to avoid early movement, timely startup for all of the robots 116 may not occur and a restart is needed. Another possible outcome of the startup for one of the robots not occurring is that the organizers and/or judges do not notice the situation, thereby creating a disadvantage for the robot(s) that did not properly start. This outcome commonly results in a contestant requesting rematches, team dissatisfaction, and significant organization difficulties. Stopping the event involves turning the system power off. Although the system may be powered off, the robots 116 are actively trying to receive signals and may cause the robots 116 to lurch or move due to radio frequency noise and/or adjacent channel communication, which tends to change the position of scoring objects.

By comparison, the instant control system provides for communication to be present before, during, and after an event. The competition organizers may control the events electronically or electrically so as to ensure that each robot starts and stops at substantially the same time. Also, disabling an individual robot 116*a*, for example, may easily be accomplished using the instant control system. To start a match or event, an enable signal may be issued to each of the arena controllers 110. The enable signal is communicated to the operator interfaces 114 and then to the robot controllers 118. Outputs of the robot controllers 118 are unlocked and the robots receive full control. During operation, a disable signal to a particular arena controller 110*a* may be utilized to disable the robot for a rule infringement or dangerous situation. To stop the match, a disable signal may be issued to each of the arena controllers 110, which is ultimately communicated to the robots 116 to prohibit movement by locking or turning off the outputs of the robot controllers 118. If communication is lost during the event due to a low battery condition on the robot 116*a*, the low battery condition may be indicated by the robot controller 118*a* and operator interface 114*a* to identify that the communication problem was the fault of the contestant and not outside the control of the contestant, such as a jamming signal.

At step 212, the robots are unloaded from the field. With regard to the use of commercial equipment, since the radio control equipment is always on and in control of the robot, and since removing heavy robots requires multiple contestants to be on the field 102 along with the robots, the situation may be dangerous. With regard to using custom control equipment, although the system may be powered off, the robots 116 are actively trying to receive signals and may cause the robots 116 to lurch or move due to radio frequency noise and/or adjacent channel communication, which may be dangerous to contestants unloading robots from the field 102. By comparison, the instant control system allows unloading to be performed manually with robots disabled, or semi-automatically using either radio or tether communication.

At step 214, a determination is made as to whether more contestants are to compete. If yes, then the field is loaded at step 208 and the next event takes place. Otherwise, the robot competition ends at step 216.

Figure 3:
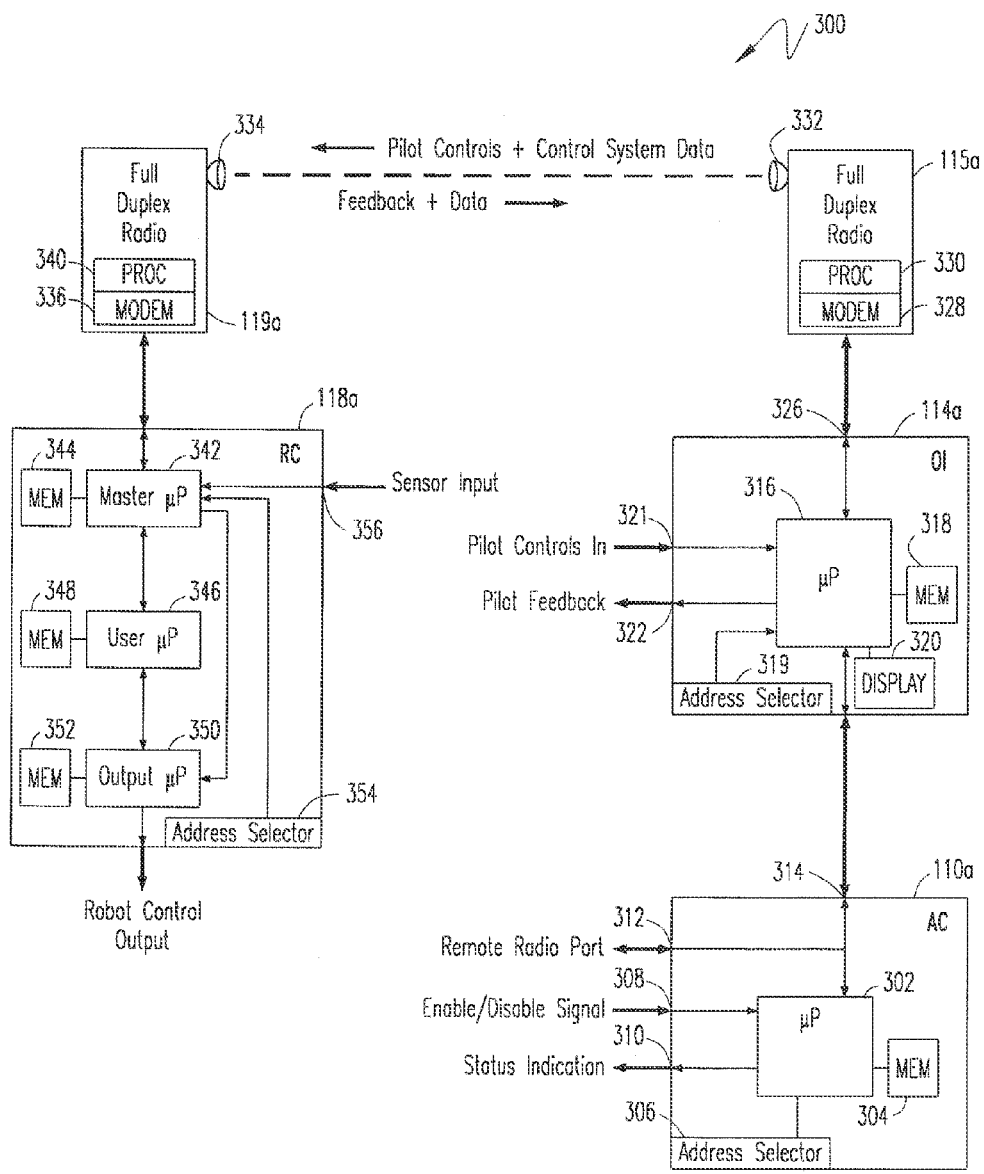
FIG. 3 is an exemplary block diagram of components of a system for controlling the robot competition conducted on the field of FIG. 1.

FIG. 3 is an exemplary block diagram of the instant control system 300 for conducting a robot competition. The control system 300 includes the arena controller 110*a*, operator 114*a*, operator radio 115*a*, robot controller 118*a*, and robot radio 119*a*.

The arena controller 110*a* is positioned at the player station 106*a* and includes a processor 302 coupled to a memory 304. A channel selector 306, such as a series of dip switches, is further coupled to the processor 302, and is utilized by the organizer of the robot competition to select a frequency channel for the contestant utilizing the arena controller 110*a*. Alternatively, the channel selector 306 may be a memory device that is loaded via data input, possibly from the field controller. Further yet, in the case of using TDMA communication, the channel selector 306 may be used to set a time slot, and in the case of using CDMA, the channel selector may be used to set a code. An input port to the arena controller 110*a* may include an enable/disable signal port to receive an enable/disable signal 308. An output port to the arena controller 110*a* may include a status indication port 310 to output status indicators. Input/output ports may include a remote radio port 312 that communicates with a remote radio (not shown). Multiple remote radios may be collocated or optimally placed to provide optimal communication within an arena between the operator interfaces 114 and the robots 116*a*. An operator radio 115*a* may be disabled via the arena controller 110*a* during communication to the robot 116*a* using the remote radio. An operator interface port 314 of the arena controller 110*a* receives data from the operator interface 114*a* to communicate to the robot 116*a* from the remote radio. It should be understood that antennas coupled to the remote radios may be collocated and provide the same functionality of collocating the remote radios. While multiple arena controllers 110 have been designated to be used around the arena 100, one or more arena controllers having input ports for multiple operator interfaces 114 could be utilized to reduce the number of arena controllers 110.

In operation, the arena controller 110*a* is utilized to assist the field controller 108 in managing the robot competition. A software program may be stored in the memory 304 and executed by the processor 302. The field controller 108 may issue an enable/disable signal to the processor 302 of the arena controller 110*a* to enable and disable the operation, not communication, of the robot 116*a*. The processor 302 is also operable to provide a status indicator to be used to notify the field controller 108 directly or simply turn on and off a light to indicate to the organizers, contestants, and audience of the robot competition that the contestant has full and proper communication with the robot 116*a*. The processor 302 also reads the channel selector 306, which is generally selected by the organizers, and utilized for data discrimination purposes by the robot 116*a*. Further, configuration bits established by the organizers may be read to determine input/output logic.

The operator interface 114*a*, utilized by the contestant to control and monitor the robot 116*a*, may be coupled to the arena controller 110*a* during an event of the robot competition. The operator interface 114*a* includes a processor 316 coupled to a memory 318, an address selector 319, and a display 320. The display 320 may include LEDs and LCDs to indicate information to the contestant. Alternatively, the display 320 may be external from the operator interface 114*a*. The operator interface 114*a* further includes a pilot control input port 321 and a pilot feedback output port 322. A pilot control device (not shown), such as a joystick, may be utilized to control the robot 116*a* via the operator interface 114*a*. The pilot feedback output port 322 may be coupled to an external display, such as a computer monitor. Two input/output ports, an arena controller port 324 and a radio port 326 are used for communicating between the arena controller 110*a* and operator radio 115*a*, respectively.

In operation, power may be provided from the arena controller 110*a* to the operator interface 114*a*. By providing power from the arena controller 110*a* to the operator interface 114*a*, connection between the two devices may be ensured, and the frequency channel of the operator interface 114*a* may be controlled. Additionally, if the operator interface 114*a* were allowed to power up independent of the arena controller 110a, the operator interface 114a would default to a non-competition channel. Communication between the arena controller 110a and the operator interface 114a may be used to authorize access to restricted competition channels and check the status of the link between the robot controller 118a and the operator interface 114a. The enable/disable signal and autonomous mode commands may be communicated between the arena controller and the operator interface 114a via data packets or other data transmission technique. The address selector 319 may be read by the processor and communicated to the robot controller 118a to identify the operator interface 114a as part of data discrimination.

The operator interface 114a receives operational data, which may be analog or digital, via the pilot controls input port 321 to control the robot 116a. The processor 316 communicates the operational data via the operator radio 115a to control the robot 116a. Feedback data from the robot 116a may be received via the radio port 326 and processed by the processor 316. The pilot feedback output port 322 may be RS-232 standard to provide the feedback data for display on a computer or the display 320. During a competition, the operator interface 114a is connected to and communicates data with the arena controller 110a to ensure that the operator interface 114a communicates with the proper robot 116a, for example.

The operator radio 115a may be full duplex and includes a modem 328 and a processor 330 with associated memory (not shown). Alternatively, the operator radio 115a may be half duplex. An antenna 332 may be coupled to the radio 115a. The robot radio 119a includes substantially the same hardware components as the robot radio 119a, including: an antenna 334, modem 336, and processor 340.

In operation, the operator radio is utilized to communication information between the operator interface 114a and the robot controller 118a. The radio processor 330 of the operator radio 115a may be electronically programmable or selectable by the processor 316 of the operator interface 114a to support scanning. In one embodiment, a low power (e.g., less than approximately 0.25 watts) at a frequency band of approximately 900 MHz. The low power is used to minimize transmission distance to less than approximately 500 feet (i.e., short range communication), and to reduce the ability for other transmitters to cause interference onto other frequency channels. An RS-422 data link as understood in the art may be used between the radio modem 328 and the radio controller 330. Alternatively, a different or non-standard data link may be utilized.

The data stream between the operator radio 115a and the robot radio 119a includes pilot controls and control system data on the downlink (i.e., from the operator radio 115a to the robot radio 119a) for controlling the robot 116a, and sensor feedback and control system data on the uplink. The data stream may be communicated using data packets as understood in the art. The data stream may be communicated using time division multiplexing (TDM) and code division multiplexing (CDM), for example. Control system data may include team number, mode (i.e., enable, disable, or autonomous), channel number, packet number, and checksum.

The robot controller 118a may include a master processor 342 and associated memory 344, a user processor 346 and associated memory 348, an output processor 350 and associated memory 352, and an address selector 354. The master processor 342 may be coupled to the user 346 and output 350 processors. The user processor 346 may further be coupled to the output processor 350. The address selector 354 may be coupled to the master processor 342. It should be understood that fewer or more processors may be utilized and/or configured in different ways, however, using three processors 342, 346, and 350 provides a clear distinction of function for the processors.

In operation, the radio controller 118 receives the downlink data from the robot radio 119a. Team number may be used to synchronize the radio controller 118a to the frequency channel of the operator interface 114a by scanning for a team number match. The team number may additionally be used to reject data received from the wrong (i.e., non-corresponding) operator interface 114a on the same or adjacent channel. As is understood in the art, a signal communicated on an adjacent channel may often be received and interpreted as being on the proper channel but having lower power. The mode may be used to define the current control state of the radio controller 118a to enable or disable robot control outputs from the output processor 350 to allow or prohibit movement of the robot 116a. In one embodiment, the master processor 342 may receive and interpret the mode and command the output processor to enable or disable output drivers of the output processor 350. Additionally, the mode may designate the robot controller 118 to operate the robot 116a in an autonomous mode (i.e., non-contestant driven).

In the autonomous mode, the master processor 342 may receive downlink data, but ignores the downlink data as the robot 116a is operating in a self-guided mode. Also, the master processor 342 does not send a disable signal to the output processor 350 due to a time-out (i.e., missed data packets) state caused by not receiving or ignoring the downlink data. The autonomous mode allows the user processor 346 to use sensor data received from a sensor input port 356 to control the robot 116a.

The uplink data, including sensor feedback and control system data, may be communicated in data packets and contain robot sensor data and looped-back pilot control data. The system data may include team number and frequency channel number. By communicating the uplink data to the operator interface, data discrimination may occur and the contestant may obtain positional and status data of the robot 116a before and during a match of the robot competition.

Software programs operating in the processors 342, 346, and 350 may be stored in the associated memories 344, 348, and 352, respectively, and operate in serial or parallel to operate the robot 116a. The master processor 342 reads the address selector 354 to perform frequency scans and data verification. The frequency scan may scan through the restricted frequency channels dedicated for competition and be performed by the master processor 342 and/or the processor 340 of the robot radio 119a. It should be understood that the restricted radio channels may be inaccessible without the password being issued to the operator interface 114a by the arena controller 110a. And, once the frequency scan sets the robot radio 119a on the correct channel, the robot radio 119a may be locked to that frequency channel by the processor 340 or master processor 342 until the robot controller 118a is powered down.

The user processor 346 may be utilized to communicate information to the master processor 342 on initialization to configure the data packets to be sent to the user processor 346. The user processor may receive control data from the master processor 342, and allows the contestant to program the handling of robot control outputs and feedback data, although some data may be communicated directly back to and handled by the master processor 342.

The output processor 350 receives data from the master 342 and user 346 processors, and generates the robot control output to driving the actuators, such as motors and relays, on the robot 116a. If the robot 116a is commanded to be disabled, then the output processor 350 does not output the robot control output.

An alternative embodiment to disabling one or more robots 116 may include a secondary communication path that allows disabling of robot movement to ensure additional safety by having an alternative or redundancy path of communication. The secondary communication path may utilize a secondary radio (not shown) coupled the arena 110a, field controller 108, or emergency button that may be readily accessible to the organizers, contestants, or audience. The secondary radio (not shown) may operate over the same or different frequency channels and communicate directly to the robot radios 119 using the same or different bit streams. Alternatively, the secondary radio may communicate directly to a secondary robot radio (not shown) that couples to the output processor 350. The secondary radio may be a low or high range and/or power radio to power down robots within approximately 500 feet or more of the emergency button. A disable signal may be communicated as discussed herein.

Figure 4:
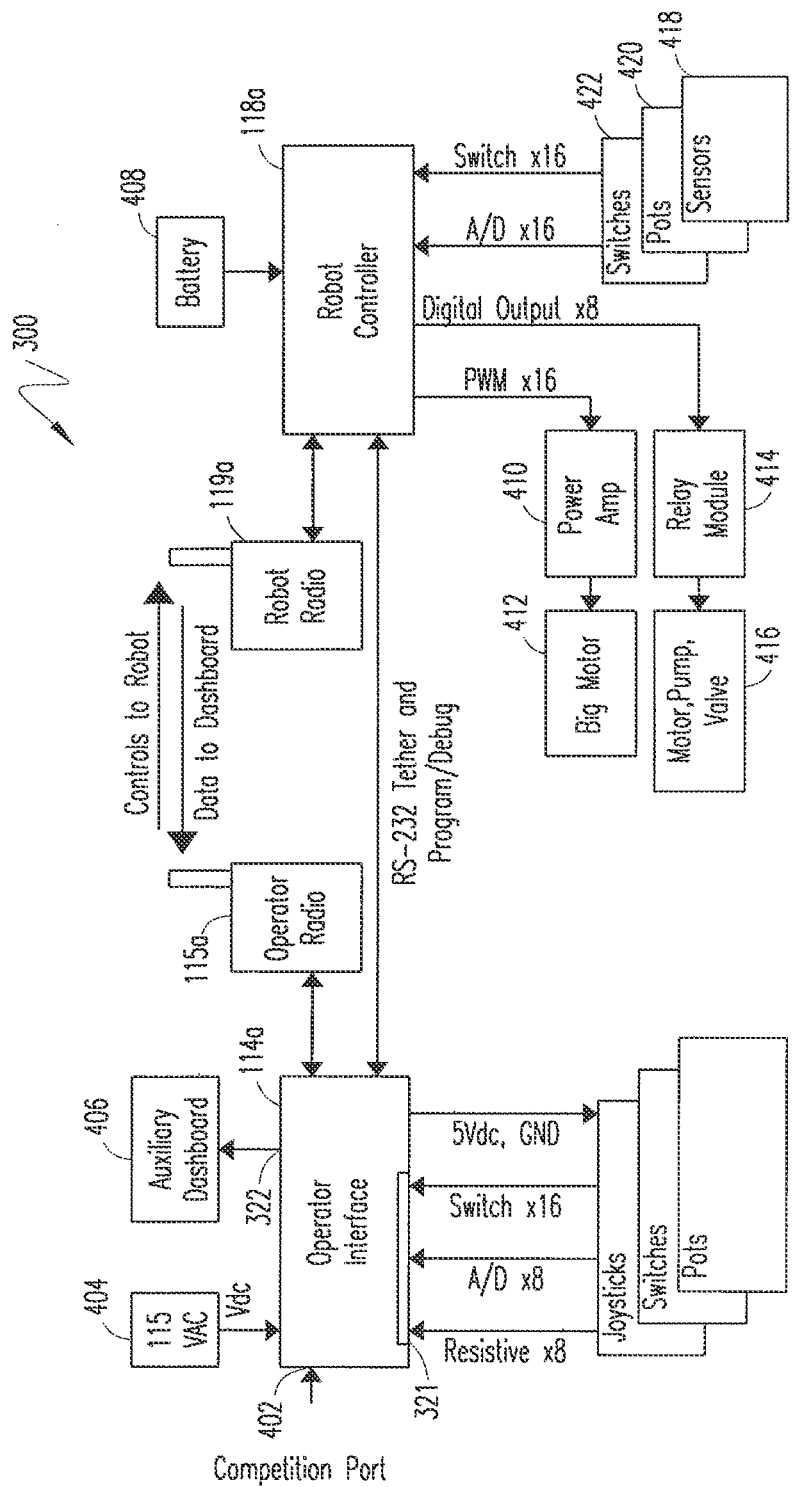
FIG. 4 is an more detailed block diagram of the components of FIG. 3.

FIG. 4 is a more detailed exemplary block diagram of the control system 300 of FIG. 3. As shown, the pilot controls input port 321 of the operator interface 114a may include digital and analog input lines and/or buses for receiving data from operator control devices, such as joysticks, switches, and potentiometers (pots), for example. Additionally, power may be delivered from the operator interface 114a to the operator control devices. A competition port 402 may also be included with the operator interface 114a to allow the organizer of the robot competition to have certain competition functions, such as accessing the restricted frequencies used for competition, turn on and off power, and enable/disable control of the robot 116a. A power converter 404 may be utilized to convert 115 VAC from a wall to a DC voltage. The pilot feedback port 322 may communicate sensor data from the robot 116a to an auxiliary dashboard or display 406. The operator interface 114a may communicate to the robot controller 118a via the operator 115a and robot 119a radios. Alternatively, the operator interface 114a may communicate with the robot controller 118a via a tether using the RS-232 interface standard.

The robot controller 118a may be coupled to a battery 408 to provide power that may be converted to digital and analog voltages by a converter (not shown) within or external from the robot controller 118a. The robot controller 118a may output pulse width modulation signals and digital output signals (i.e., robot control output) to power amplifiers 410 to drive a big motor and relay modules 414 to drive smaller motors, pumps, solenoids, and valves. Feedback signals from sensors, pots, and switches may be received by the robot controller 118a in analog or digital form. Analog-to-digital (A/D) converters may be utilized to convert the analog feedback signals so that the master processor 342 of the robot controller 118a may communicate the information in packets back to the operator interface 114a.

Figure 5:
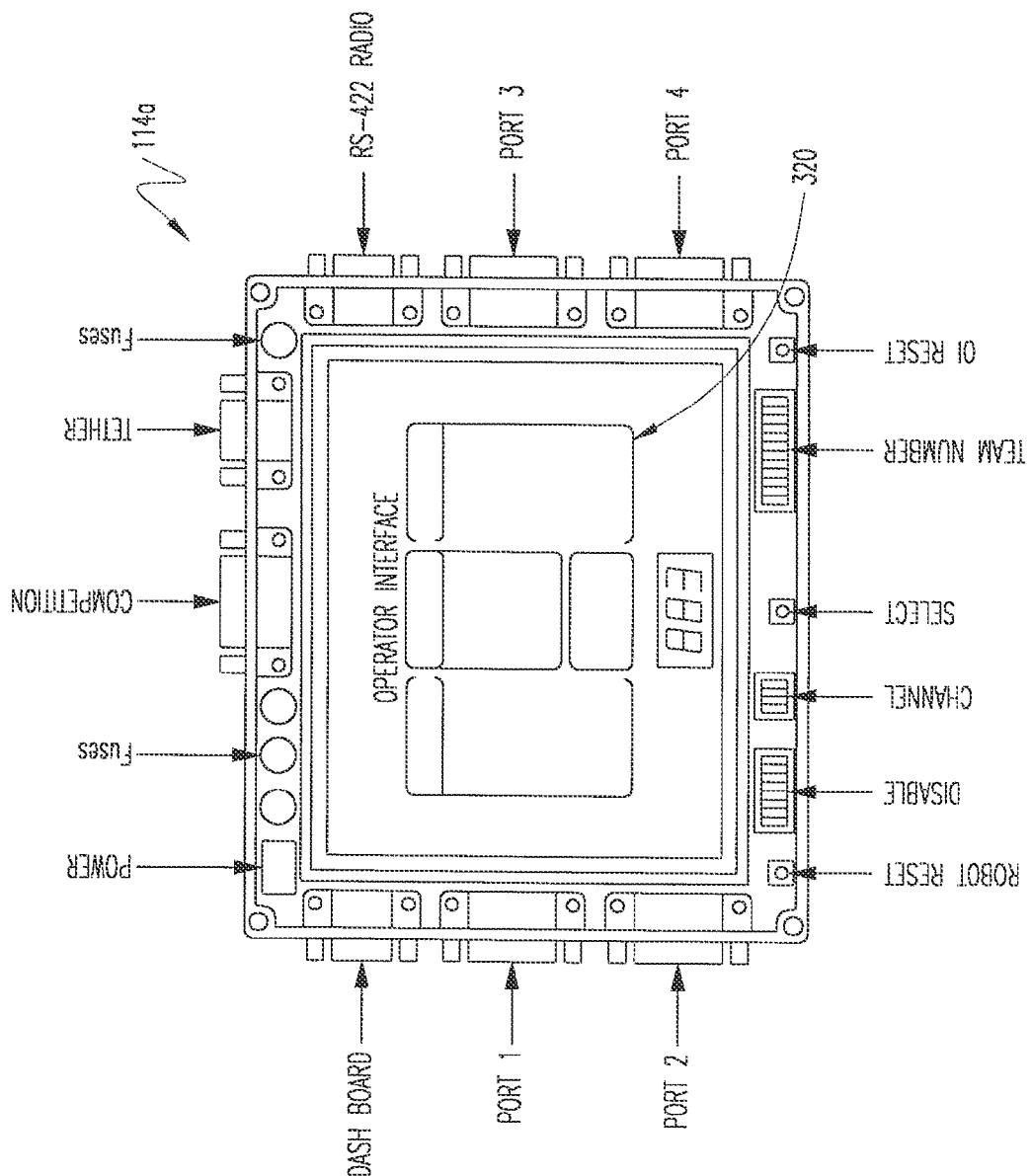
FIG. 5 is an exemplary mechanical schematic of an operator interface of FIG. 4.

FIG. 5 is an exemplary hardware schematic of the operator interface 114a showing exemplary input and output ports. Ports 1-4 are provided to allow a contestant to utilize multiple control devices to operate the robot. Additionally, a number of selectors, such as user channel and address (i.e., team number) selector 319, are shown as being accessible to the contestant. Alternatively, the selectors may be software switches. Other selectors and ports should be recognized by those skilled in the art. On the face of the operator interface 114a, a display containing LEDs and seven-segment LEDs, or an LCD, may be provided to display the contestant information. The display 320 is discussed further with regard to FIG. 10A.

Figure 10A:
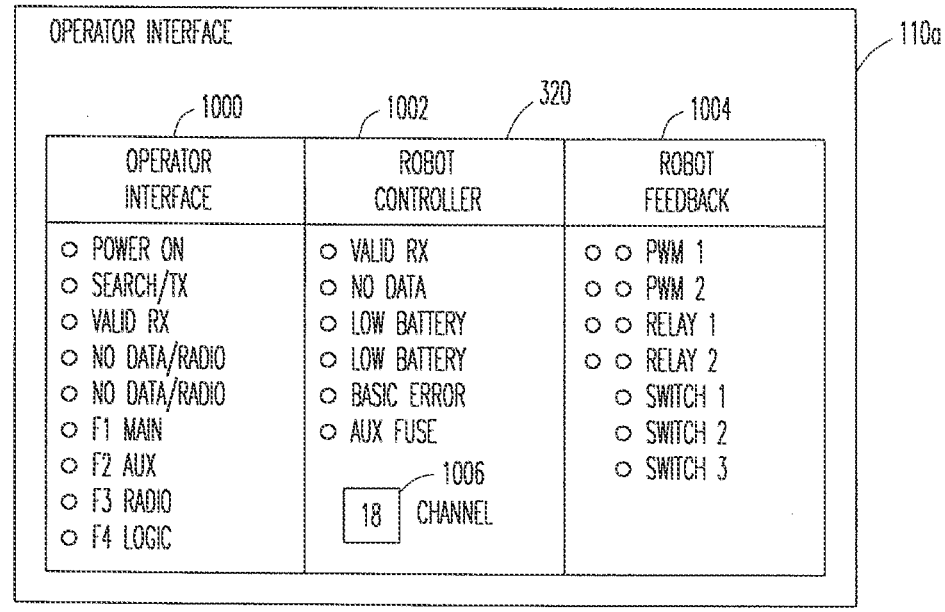
FIGS. 10A and B is an exemplary display for providing a contestant of the robot competition information being fed back from the robot to the contest.

FIG. 10A is an exemplary display of the operator interface 110a. As shown, there are three groups of LEDs, including: operator interface 1000, robot controller 1002, and robot feedback 1004 groups. The operator interface group 1000 provides a status of hardware and/or communication operation of the operator interface 110a. The robot controller group 1002 provides a status of power and communication operation of the robot controller 118a. The robot feedback group 1004 provides software controlled status of sensor and actuator devices on the robot 116a. A seven-segment LED display 1006 may be included to display the frequency channel on which the operator interface 110a is currently communicating, and to display other relevant numeric data.

Figure 6:
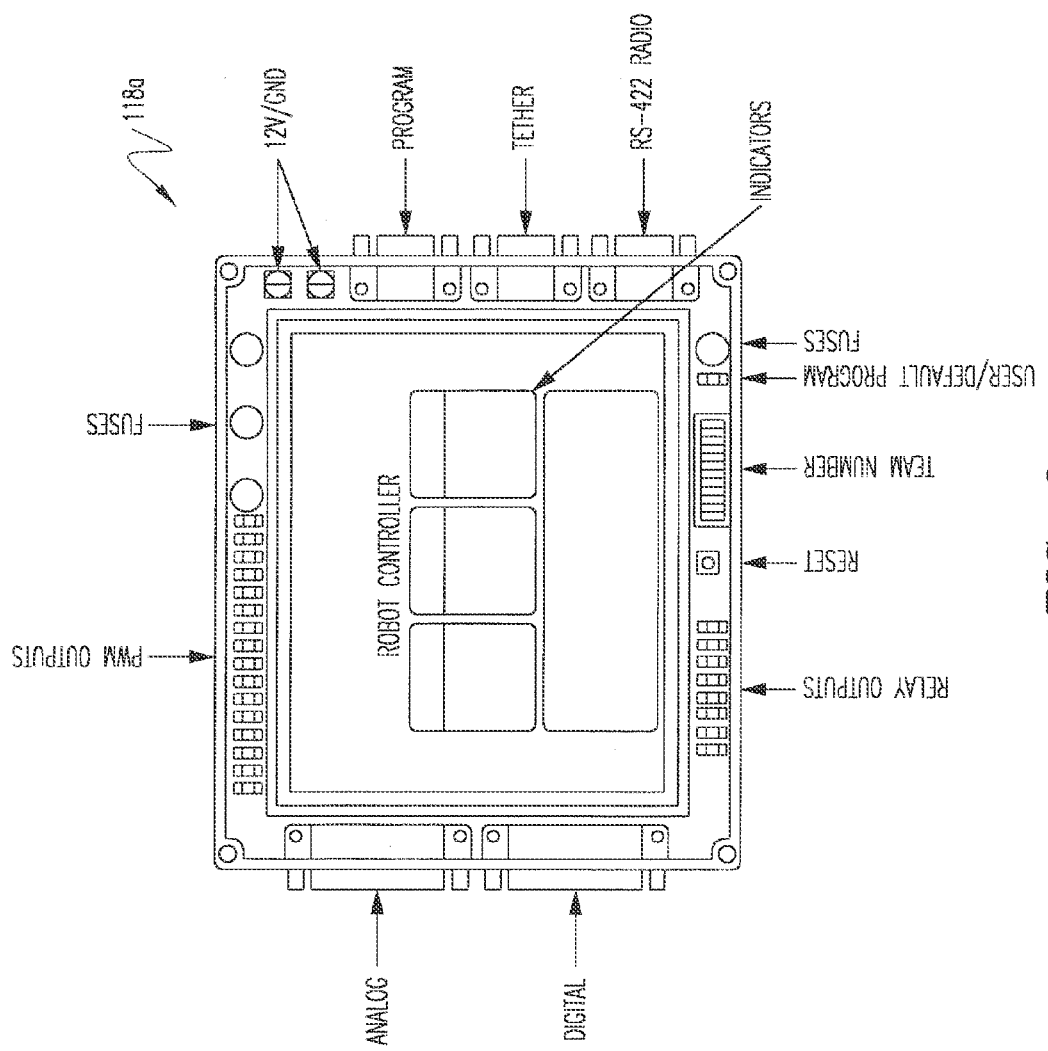
FIG. 6 is an exemplary mechanical schematic of a robot controller of FIG. 4.

FIG. 6 is an exemplary mechanical schematic of the robot controller 118a providing selectors and communication ports, including communication ports for a radio and tether input, as previously discussed and understood in the art. Additionally, a display including indicators, such as LEDs, may be provided on the robot controller 118a, to provide the contestant an indication as to the status and operation of the robot controller 118a. The display of the robot controller 118a is discussed further with regard to FIG. 10B.

Figure 10B:
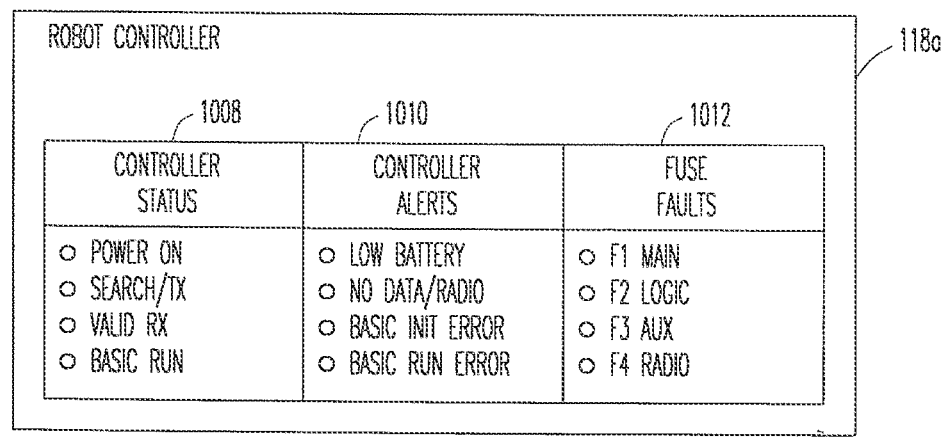

FIG. 10B is an exemplary display of the robot controller 118a. The display includes three groups, including: controller status 1008, controller alerts 1010, and fuse faults 1012 groups. The controller status group 1008 indicates power, communication, and software execution of the robot controller 118a. The controller alerts group 1010 notifies the contestant as to power, communication, and software execution of the robot controller 118a during operation of the robot 116a. The fuse faults group 1012 provides an indication as to fuses that fail during operation of the robot 116a. It should be understood that the items displayed are exemplary and may be different based on desirability by the developer, operator, and/or contestants of the robot competition for both the operator interface 110a and the robot controller 118a.

Figure 7:
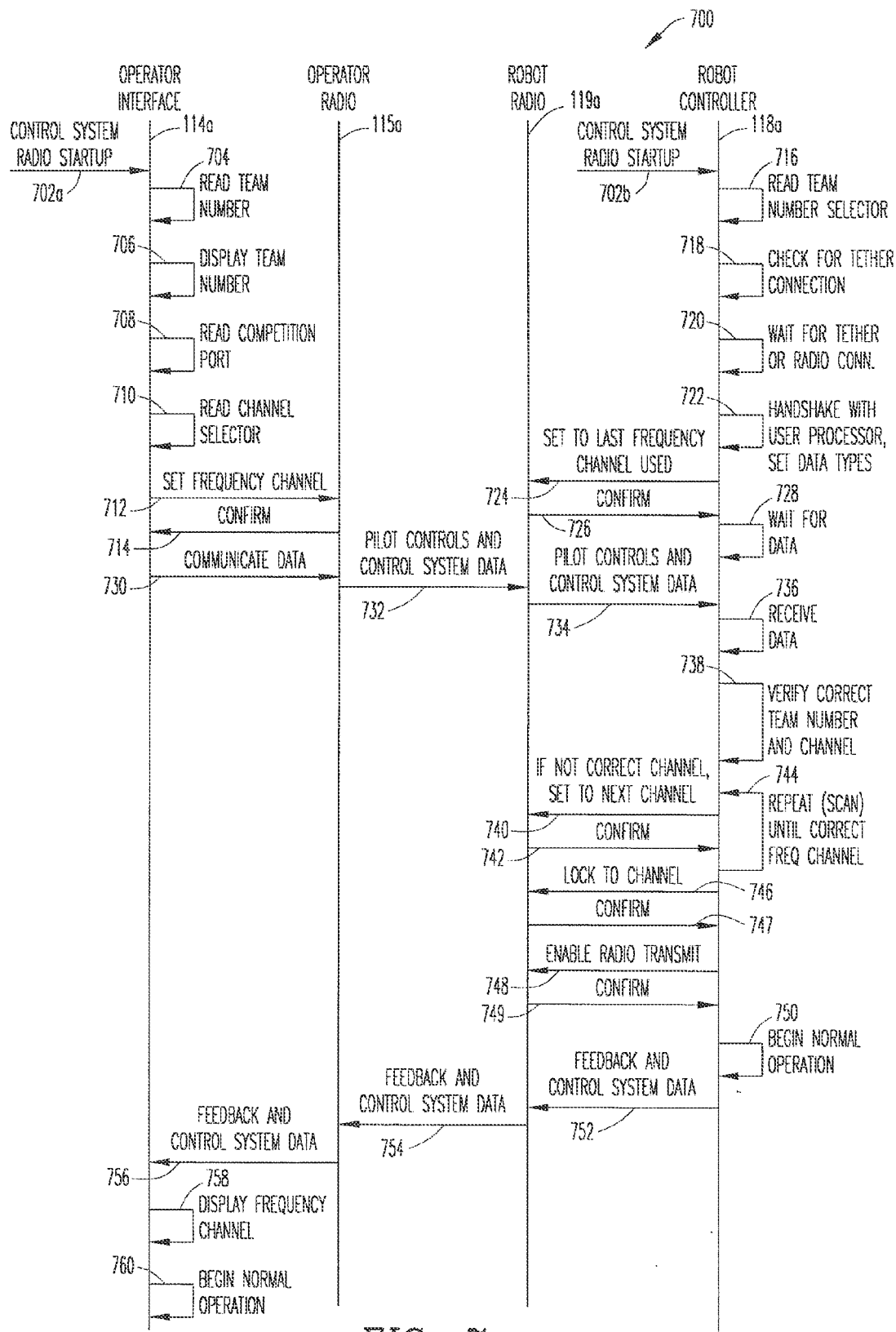
FIG. 7 is an exemplary interaction diagram of the control system of FIG. 4 showing an exemplary flow for radio startup.

FIG. 7 is an exemplary interaction diagram 700 describing operations and communications between operator and robot components for startup of the control system using the operator radio 115a. The process starts at step(s) 702a and 702b as both the operator interface 114a and robot controller 118a are started up independently.

With regard to the operator interface 114a, the team number is read at step 704 and displayed at step 706. At step 708, the competition port is read to determine whether the operator interface 114a is being utilized in a robot competition setting. The frequency channel selector may then be read, if necessary, at step 710. The operator interface 114a commands the operator radio 115a, or the processor 330 therein, to the frequency channel, and a confirmation may be communicated back to the operator interface 114a. Data may now be transmitted by the operator radio 115a thereafter.

With regard to the robot controller, the team number is read at step 716. At step 718, the robot controller 118a determines whether control is to be performed via a tether connection. The robot controller 118a waits until a tether or radio connection is made. The master processor 342 performs a handshake with the user processor to get data types to be used for data communication at step 722. At step 724, the robot controller 118a sets the robot radio 119a to the last frequency channel used and a confirmation is communicated back to the robot controller at step 726. The master processor 342 waits for data to be received from the robot radio 119a at step 728.

At step 730, data continues to be communicated from the operator interface 114a to the operator radio 115a. The data may include the pilot controls and control system data, and may be communicated from the operator radio 115a to the robot radio 119*a*. The robot radio 119*a* communicates the data to the robot controller 118*a* at step 734. The data is received at step 736 by the master processor 342, and a verification process to determine whether the correct team number and frequency channel were received at step 738. The team number is deemed to be correct if the team number received from the operator interface 114*a* matches the team number of the robot controller 118*a*. The frequency channel number is deemed to be correct if the frequency channel number received from the operator interface 114*a* matches the frequency channel that the robot radio 119*a* resides. If the team number is not correct, then the data is discarded and the robot controller may wait for data again at step 728.

If the frequency channel is not correct, the robot controller 118*a* sets the robot radio 119*a* to a next frequency channel at step 740. The robot radio 119*a* confirms the channel selection to the robot controller 118*a* at step 742. The frequency channel is scanned or swept at step 744 until the frequency channel of the robot radio 119*a* matches the frequency channel received from the operator interface 114*a*. Once the frequency channel of the robot radio 119*a* matches the frequency channel received from the operator interface 114*a*, the frequency channel of the robot radio 119*a* is locked at step 746 and confirmed at step 747. To avoid possible safety problems, the frequency channel of the robot radio 119*a* remains locked until the robot controller 118*a* is powered off. At step 748, radio transmission of the robot radio 119*a* is enabled and confirmed at step 749. At step 750, the robot controller 118*a* begins normal operation.

At step 752, feedback and control system data is communicated from the robot controller 118*a* to the robot radio 119*a*. The feedback and control system data is thereafter communicated to the operator radio 115*a* and ultimately to the operator interface 114*a* at step 756. The frequency channel may be displayed on the operator interface 114*a* at step 758. Normal operation of the operator interface 114*a* may begin at step 760. It should be understood that startup of the control system using the operator radio 115*a* may be performed in a different manner than shown in FIG. 7, but that the functionality may achieve similar results.

Figure 8:
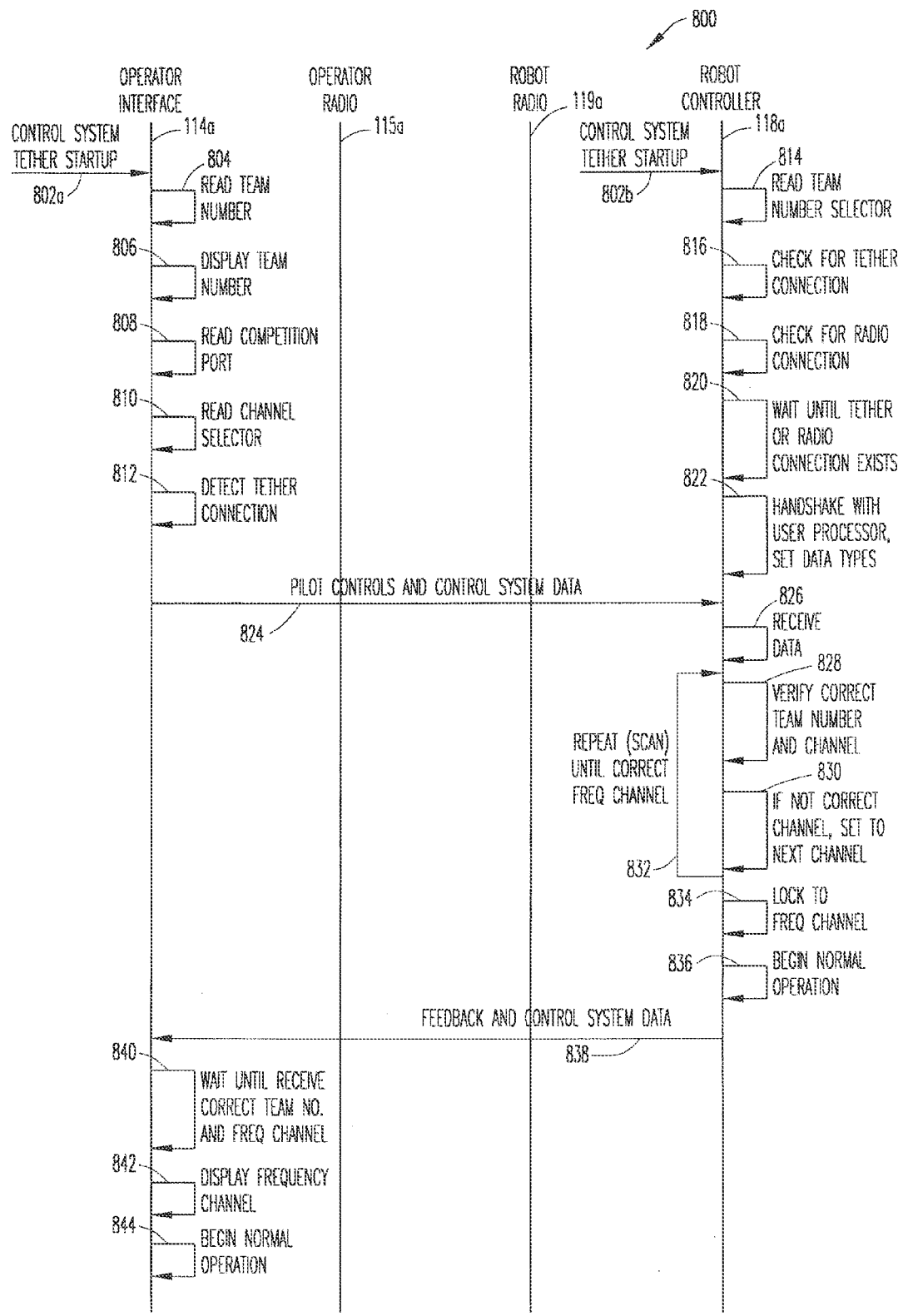
FIG. 8 is an exemplary interaction diagram of the control system of FIG. 4 showing an exemplary flow for tether startup.

FIG. 8 is an exemplary interaction diagram 800 describing operations and communications between operator and robot components for tether startup of the control system using the operator radio 115*a*. The process starts at step(s) 802*a* and 802*b* as both the operator interface 114*a* and robot controller 118*a* are started up independently.

With regard to the operator interface 114*a*, the team number is read at step 804 and displayed at step 806. At step 808, the competition port is read to determine whether the operator interface 114*a* is being utilized in a robot competition setting. The frequency channel selector may then be read, if necessary, at step 810. The operator interface 114*a* detects a tether connection at step 812. Once the tether connection is detected, the operator interface 114*a* starts sending data and communicates via the tether connection and does not communicate via the operator radio 115*a*.

With regard to the robot controller, the team number is read at step 814. At step 816, the robot controller 118*a* determines whether control is to be performed via a tether connection. The robot controller 118*a* may also check for a connection to the robot radio 119*a*. The robot controller 118*a* waits until a tether or radio connection is made at step 820. At step 822, the master processor 342 performs a handshake with the user processor to get data types to be used for data communication.

At step 824, the operator interface communicates pilot controls and control system data via the tether, which may be a wire cable or fiber optic line, for example. The robot controller receives the data at step 826 and verifies the correct team number and channel at step 828. If it is determined that the robot controller is not set to the correct channel, the next channel is selected at step 830. The robot controller 118*a* repeats the channel verification process at step 832 until the channel of the robot controller 118*a* matches the frequency channel number communicated by the operator interface 114*a*.

At step 834, after the frequency channel of the robot controller 118*a* matches the frequency channel of the operator interface, the frequency channel of the robot controller 118*a* is locked. By locking the frequency channel of the robot controller 118*a* until the robot controller 118*a* is powered down, safety is further increased. At step 836, the robot controller 118*a* begins normal operation.

At step 838, the robot controller 118*a* communicates feedback and control system data via the tether connection to the operator interface 114*a*. at step 840, the operator interface 114*a* waits until the correct team number and frequency channel is received from the robot controller 118*a*. The frequency channel is displayed on the display 320 of the operator interface 114*a* or external display at step 842. The operator interface 114*a* begins normal operation at step 844. It should be understood that startup of the control system using the tether may be performed in a different manner than shown in FIG. 8, but that the functionality may achieve similar results.

Figure 9:
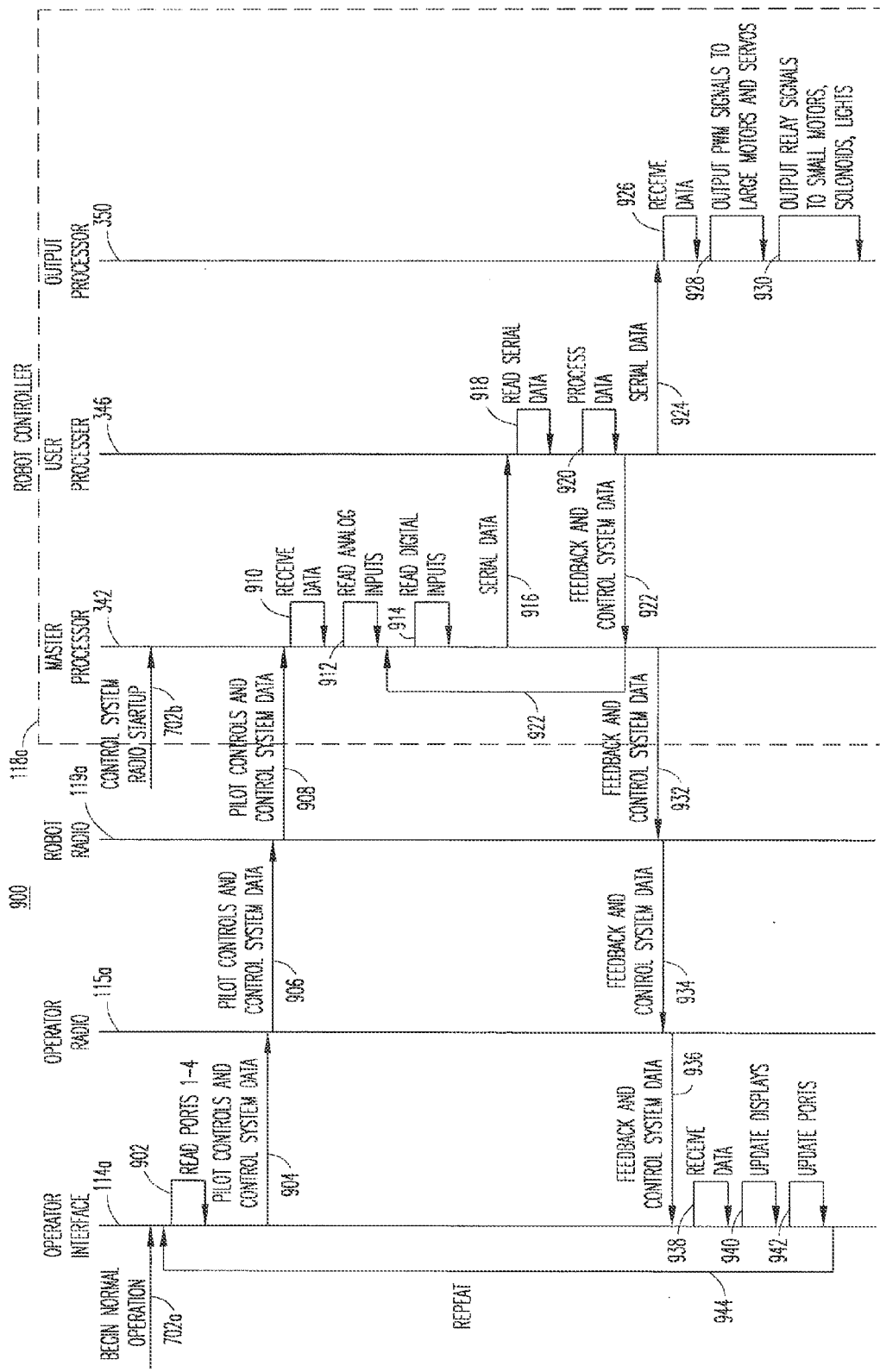
FIG. 9 is an exemplary interaction diagram of the control system of FIG. 4 showing a flow of operations for conducting normal operation of the control system.

FIG. 9 is an exemplary interaction diagram of the control system of FIG. 4 showing a flow of operations for conducting normal operation of the control system. At step(s) 902*a* and 902*b*, normal operation of the operator interface 114*a* and robot controller 118*a* commences. As shown the robot controller 118*a* has been expanded to include the three processors, including the master processor 342, user processor 346, and output processor 350. It should be understood that the robot controller 118*a* could include one processor to perform the functions of the three processors, but separating the functions onto the different processor reduces the load for each processor. Alternatively, rather than using a processor for the output processor 350, for example, a digital logic circuit or other device may be utilized for performing the functions of the output processor 350.

At step 902, the processor 316 of the operator interface 114*a* reads the pilot controls input port 321, which may include multiple input ports as shown in FIG. 5 to read multiple control devices, such as joysticks and switches. At step 904, pilot controls and control system data are communicated to the operator radio 115*a*, which further communicates the pilot controls and control system data to the robot radio 119*a* at step 906. The robot radio 119*a* thereafter communicates the pilot controls and control system data to the master processor 342 at step 908.

At step 910, the master processor 342 receives the data. The master processor may perform a data integrity test (not shown) using the control data, such as checksum, channel, and team number, before utilizing the received data for controlling the robot 116*a*. If it is determined that the data is not valid for any reason, the robot 116*a* may utilize the previously valid data for up to five data receptions, for example. After the five data receptions, the robot 116*a* may be disabled by turning off control output from the output processor 350 and/or robot power, for example. The analog inputs from sensors located on the robot 110*a* are read by the master processor at step 912. At step 914, the digital inputs from sensors located on the robot 110*a* are read by the master processor 342. Information, including pilot controls and control system data, analog data, and digital data, may be communicated over a serial bus to the user processor 346 at step 916. At step 918, the serial data is read by the user processor. Using a serial bus provides the contestant the ability to replace the user processor with a new or different processor and be confident that the new or different processor can operate in the robot controller without major rework, such as rewiring or altering of signal timing. The data received via the serial bus is processed at step 920. The data may be utilized to control the operation and/or movement of the robot 110*a*.

At step 922, the user processor 346 communicates feedback and control systems data to the master processor 342. The feedback and control systems data may be utilized by the master processor to further control the robot 110*a*. At step 924, the user processor may communicate data across another serial bus to the output processor 350. The data, which may include information to drive actuator devices, such as motors and switches and/or lights, may be received by the output processor 350 at step 926. Again, the use of the serial bus allows the contestant to upgrade the robot controller 118*a* by simply changing the output processor 350 that utilizes a serial bus. At step 928, pulse width modulation (PWM) signals that are used to drive large motors efficiently may be output from the output processor 350 to the actuator devices. At step 930, output signals to smaller actuators, such as small motors, solenoids, and lights, may be output from the output processor 350.

At step 932, the master processor 342 of the robot controller 118*a* communicates feedback and control systems data 932 to the robot radio 119*a*, which further communicates the data to the operator radio at step 934. At step 936, the operator radio 115*a* communicates the feedback and control systems data to the processor 316 of the operator interface 114*a*. The data is received by the processor 316 of the operator interface at step 938, and displays are updated at step 940. The displays may include the display 320 of the operator interface or an external display communicated via the pilot feedback port 322 at step 942. The process is repeated at step 944 until, the unit is shut down or communication is lost, for example. It should be understood that normal operation of the control system may be performed in a different manner than shown in FIG. 9, but that the functionality may achieve similar results.

Figure 11A:
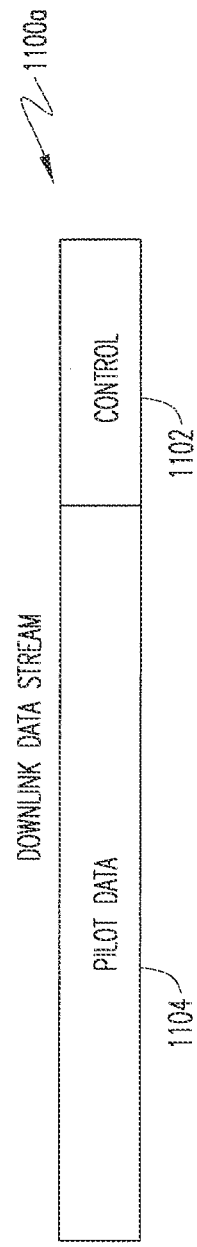
FIGS. 11A and 11B are exemplary data downlink and uplink data streams, respectively, for communicating information between the operator interfaces and robots of FIG. 1.
Figure 11B:
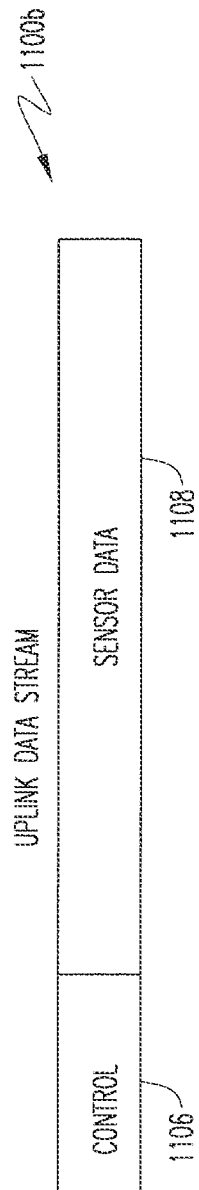

FIGS. 11A and 11B show exemplary downlink 1100*a* and uplink 1100*b* data streams, respectively. Both of the data streams 1100*a* and 1100*b* include both control and data information, and may be communicated using data packets. As understood in the art, the downlink data stream 1100*a* communicates data from the operator interface 115*a* to the robot controller 118*a*, and the uplink data stream 1100*b* communicates data from the robot controller 118*a* to the operator interface 115*a*.

The downlink data stream 1100*a* includes control 1102 and pilot 1104 data, which may include analog and digital data, to control functionality or operability and movement of the robot 116*a*. As suggested, the pilot data 1104 includes data generated by a contestant using a control device, such as a joystick, to control the robot 116*a*. The uplink data stream 1100*b* includes control 1106 and sensor 1108 data, which may include analog and digital data, to operate as telemetry data for the contestant. The sensor data 1108 data may be utilized for display purposes. TABLES 1 and 2 provide exemplary downlink and uplink, respectively, data stream information.

As shown, both the downlink and uplink data packets utilize a hexadecimal number, 0xff, 0xff, which is 255 in base ten, in the first two bytes to indicate a start of the data packet. The value of the start of the data packet may alternatively be another value. The other bytes, therefore, are to remain between 0 and 254 so that the processors do not consider a non-start byte the start of a data packet. The data included in the data packets are not arranged in any particular order, such as passing control data first and pilot data second.

The control data includes CTRL_A, CTRL_B, CTRL_C, PACKET NUMBER, CHECKSUM_A, and CHECKSUM_B. The CTRL_A data includes four mode bits, including an enable/disable bit and autonomous mode bit, and four team number bits. The CTRL_B data includes eight bits of additional team number. The CTRL_C data includes two mode bits and six channel number bits. The packet number may indicate a particular packet for reference purposes. The CHECKSUM_A and CHECKSUM_B data are BCH style checksums as understood in the art. It should be understood that the control data may be alternatively organized and a different number of bits may be used to communicate the information. Furthermore, other control information may be communicated on the downlink and uplink data packets for system control purposes.

The pilot data in the downlink packet includes analog and digital data. Both the analog and digital data is communicated in a digital format. The PWM data is pulse width modulation data that is used to control motors, for example. Digital data may be used to control switches, relays, and lights, for example. It should be understood that alternative pilot data may be communicated on the downlink data packet. The sensor data in the uplink packet includes analog and digital data for indicating operation and status of the robot and electro-mechanical devices coupled thereto. The particular data communicated on the uplink may be selectively applied by the contestant. It should be further understood that the downlink and uplink data may include more or fewer number of bytes of data.

The robot controller 118*a* and operator interface 114 have processors and associated software operable to receive and communicate the uplink and downlink data as understood in the art. Additionally, the robot controller 118*a* and operator interface 114 may include hardware or software for parsing and forming the uplink and downlink data packets as understood in the art.

TABLE 1

| DOWNLINK DATA PACKET | |
|---|---|
| BYTE | DATA |
| 1-2 | 0xff, 0xff (start of packet) |
| 3 | PWM1 |
| 4 | SWITCHES_A |
| 5 | PWM2 |
| 6 | SWITCHES_B |
| 7 | PWM3 |
| 8 | CTRL_A |
| 9 | PWM4 |
| 10 | CTRL_B |
| 11 | PWM5 |
| 12 | CTRL_C |
| 13 | PWM6 |
| 14 | PACKET NUMBER |
| 15 | PWM7 |
| 16 | CHECKSUM_A |
| 17 | PWM8 |
| 18 | CHECKSUM_B |
| 19 | PWM9 |
| 20 | PWM10 |
| 21 | PWM11 |
| 22 | PWM12 |
| 23 | PWM13 |
| 24 | PWM14 |
| 25 | PWM15 |
| 26 | PWM16 |

TABLE 2

| BYTE | DATA |
| --- | --- |
| 1-2 | 0xff, 0xff (start of packet) |
| 3 | ANALOG1 |
| 4 | SWITCHES_A |
| 5 | ANALOG2 |
| 6 | SWITCHES_B |
| 7 | ANALOG3 |
| 8 | CTRL_A |
| 9 | ANALOG4 |
| 10 | CTRL_B |
| 11 | ANALOG5 |
| 12 | CTRL_C |
| 13 | ANALOG6 |

Figure 12:
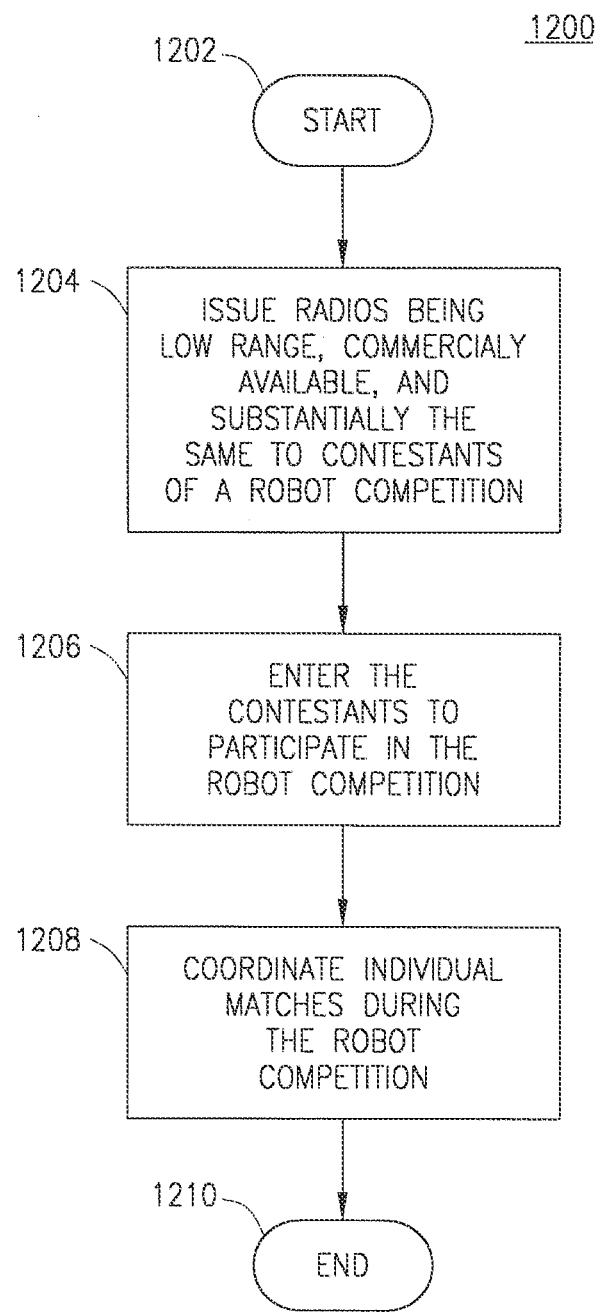
FIG. 12 is an exemplary flow diagram describing a method for conducting the robot competition of FIG. 1.

FIG. 12 is an exemplary flow diagram 1200 describing a method for conducting the robot competition of FIG. 1. The process starts at step 1202. At step 1204, sets of operator interfaces and radios being substantially the same are issued to contestants of the robot competition. The issuance may be provided for cost or no cost. At step 1206, the contestants to participate in the robot competition are entered. The organizers coordinate individual matches during the robot competition at step 1208. The coordination may include assigning frequency channels, starting and stopping the matches, supervising point scoring for the contestants, and ensuring safety of the robots both on and off the field of the arena 100. The process ends at step 1210.

Although the robot control system 300 herein described is directed to being utilized for a robot competition, the principles of the present invention may be utilized for non-robot competition applications. Such non-robot competition applications may include educational uses, military applications, and general hobby robot applications. Other potential applications may include transportation vehicles, heavy equipment, amusement park rides, and those vehicles desiring remote safety controls, for example. Additionally, while the robot control system 300 generally includes using low power radios for indoor use, applications that are performed outdoors generally desire longer ranges. To accommodate the longer ranges, radio power may be increased to communicate over longer distances.

The previous description is of a preferred embodiment for implementing the invention, and the scope of the invention should not necessarily be limited by this description. The scope of the present invention is instead defined by the following claims.

We claim:

1. A system for operating robots in a robot competition, said system comprising:
    a plurality of operator interfaces, each operator interface being operable to control movement of a respective robot;
    a first plurality of radios, each first radio being in communication with a respective operator interface, and having a low power RF output signal, each first radio tuned to a unique communications channel;
    a plurality of robots;
    a plurality of robot controllers, each robot controller coupled to a respective robot; and
    a second plurality of radios, each second radio coupled to a respective robot and in communication with a respective robot controller and first radio, and having a low power RF output signal while communicating with the respective first radio, each second radio tuned to a communications channel corresponding to the unique communications channel of a corresponding first radio.

2. The system according to claim 1, wherein the low power RF output signal is a maximum of approximately 0.25 watts.

3. The system according to claim 1, wherein said first plurality of radios have a maximum communication range of approximately 500 feet.

4. The system according to claim 1, wherein said first plurality of radios are substantially the same.

5. The system according to claim 1, wherein said first and second radios operate in full duplex.

6. The system according to claim 1, wherein said first and second radios communicate on an RS-422 communication standard.

7. A system for operating robots in a robot competition, said system comprising:
    a plurality of operator interfaces, each operator interface being operable to control movement of a respective robot;
    a first plurality of radios, each first radio being in communication with a respective operator interface on a unique communications channel, and having a short communication range;
    a plurality of robots;
    a plurality of robot controllers, each robot controller coupled to a respective robot; and
    a second plurality of radios, each second radio coupled to a respective robot and in communication with a respective robot controller and first radio on the unique communications channel as a corresponding first radio, and having a short communication range.

8. The system according to claim 7, wherein said first radios have low power RF output signal of a maximum of approximately 0.25 watts.

9. The system according to claim 7, wherein the short communication range is a maximum of approximately 500 feet.

10. The system according to claim 7, wherein said first plurality of radios are substantially the same.

11. The system according to claim 7, wherein said first and second radios operate in full duplex.

12. The system according to claim 7, wherein said first and second radios communicate on an RS-422 communication standard.

13. A system for controlling a robot competition having a plurality of robots engaged therein, said system comprising:
    at least one arena controller operable to provide control of the robots;
    a plurality of operator interfaces coupled to said at least one arena controller; and
    a plurality of operator radios being in one-to-one correspondence with said plurality of operator interfaces and coupled thereto, each of the plurality of operator radios in communication with a corresponding operator interface on a unique communications channel.

14. The system according to claim 13, wherein each of said plurality of operator radios operate on a separate channel as commanded by a corresponding arena controller.

15. The system according to claim 14, wherein said at least one arena controller further provides control of said operator interfaces.

16. The system according to claim 13, wherein said operator radios are capable of communicating on channels restricted for tournament use.

17. The system according to claim 13, wherein the control includes at least one of the following:
  enabling and disabling of the robots, and
  allocating of a channel.

18. The system according to claim 13, further comprising a plurality of robot controllers operable to control a corresponding robot, each robot controller coupled to a robot radio to communicate with a corresponding operator radio.

19. The system according to claim 18, wherein the robot controllers include a sweep means for sweeping the operator frequencies of the robot radios.

20. The system according to claim 13, further comprising a field controller coupled to said at least one arena controller.

\* \* \* \* \*